US007347258B2

(12) United States Patent
McKeen

(10) Patent No.: US 7,347,258 B2
(45) Date of Patent: Mar. 25, 2008

(54) COATED TOOLS FOR USE IN OIL WELL PIPES

(75) Inventor: Laurence Waino McKeen, Sewell, NJ (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 129 days.

(21) Appl. No.: 11/286,599

(22) Filed: Nov. 23, 2005

(65) Prior Publication Data

US 2006/0108110 A1 May 25, 2006

Related U.S. Application Data

(60) Provisional application No. 60/630,779, filed on Nov. 24, 2004.

(51) Int. Cl.
*E21B 17/00* (2006.01)

(52) U.S. Cl. ................. 166/242.1; 166/902; 428/36.91

(58) Field of Classification Search ............. 166/244.1, 166/902, 242.1; 428/35.7, 36.9, 36.91; 138/145, 138/146
See application file for complete search history.

(56) References Cited

U.S. PATENT DOCUMENTS

| 3,087,827 A | | 4/1963 | Klenke, Jr. et al. |
| 3,087,828 A | | 4/1963 | Linton |
| 3,087,829 A | | 4/1963 | Linton |
| 3,779,793 A | * | 12/1973 | Hughes et al. ............... 427/379 |
| 3,925,582 A | * | 12/1975 | Sample et al. ........... 427/385.5 |
| 4,380,618 A | | 4/1983 | Khan et al. |
| 4,743,658 A | | 5/1988 | Imbalzano et al. |
| 4,823,456 A | | 4/1989 | Gray |
| 5,932,673 A | | 8/1999 | Aten et al. |
| 5,972,494 A | | 10/1999 | Janssens |
| 6,159,547 A | | 12/2000 | McMordie et al. |
| 6,232,372 B1 | | 5/2001 | Brothers et al. |
| 6,518,349 B1 | | 2/2003 | Felix et al. |
| 6,773,815 B2 | * | 8/2004 | Amouroux ................... 428/418 |
| 2004/0138367 A1 | * | 7/2004 | Lahijani ..................... 524/439 |
| 2005/0016610 A1 | * | 1/2005 | Lahijani ..................... 138/145 |
| 2006/0127622 A1 | * | 6/2006 | Mohan et al. ........... 428/36.91 |
| 2006/0137757 A1 | * | 6/2006 | McKeen et al. ............. 138/145 |

FOREIGN PATENT DOCUMENTS

WO     WO 99/53170     10/1999

* cited by examiner

*Primary Examiner*—Kenneth Thompson

(57) ABSTRACT

The present invention relates to a tool for use in an oil pipe having a fluoropolymer coating imparting substantially reduced adhesion of asphaltenes, paraffin wax, and inorganic scale, so as to reduce plugging of said tool, and impermeability to salt water so as to protect the tool pipe from corrosion. Such a tool is particularly useful in a pipe coated in a similar manner.

7 Claims, No Drawings

COATED TOOLS FOR USE IN OIL WELL PIPES

CROSS-REFERENCE TO RELATED APPLICATION

This application claims priority under 35 U.S.C. §119 from U.S. Provisional Application Ser. No. 60/630,779, filed Nov. 24, 2004.

BACKGROUND OF THE INVENTION

1. Field of the Invention

This invention relates to tools used in pipes that convey oil, such as oil well pipes and oil pipelines, and more particularly to coatings for the exterior surface of such tools, especially when used in oil pipes coated with such coatings.

2. Description of Related Art

Oil pipes for conveying large volumes of oil have two primary utilities, as down-hole pipes for conveying oil from underground deposits to the earth surface and as pipelines for the long distance transportation of oil across the earth surface. Such pipes are typically made from carbon steel for economy reasons, rather than expensive specialty metal alloys that better resist the corrosive entities in the crude oil. The corrosion is especially severe in the hot underground environment of the oil deposit from such materials as water, sulfur, sulfur dioxide, carbon dioxide, hydrogen sulfide, present in the oil typically making it acidic. These materials corrode the oil pipe even at relatively low temperatures of oil transportation; the long contact times with the oil pipeline interior surface provide the conditions for corrosion to occur.

An additional problem arises from soluble organic material present in the oil at the high temperature of the oil deposit, such as asphaltenes and paraffin waxes and with soluble inorganic material, commonly referred to as scale, and generally comprising calcite and/or barite, present in the oil or in the presence of salt water associated with the conveying of oil from underground deposits. These materials become insoluble as the oil cools, as occurs during the rise of the oil through the down-hole pipe to the earth surface. The resultant insoluble materials tend to plate out on the interior surface of the pipe, restricting the oil flow therethrough and eventually plugging the pipe. This pluggage also occurs during long distance conveying of the oil through pipelines. This requires the oil pipes to be cleaned out, during which time oil production or transportation, as the case may be, ceases.

Tools which are used in oil well pipes under such conditions are subject to similar problems which plague the interior surfaces of pipes, namely, corrosion, and the plating out of asphaltenes and paraffin waxes on their surfaces. Attempts have been made to coat tools used in oil wells to address abrasion resistance and corrosion. For example, U.S. Pat. No. 4,823,456 discloses a method for coating a sucker rod, where nylon or polyphenylene sulfide is used. However, such materials do not possess the non-stick properties that are necessary to prevent deposition of asphaltenes and paraffin waxes. Therefore, at this time there does not exist a commercially attractive option for reducing pluggage and corrosion on tools used in pipes.

There remains a need for solving the problems of corrosion and pluggage occurring on the surfaces of tools used in oil pipes.

BRIEF SUMMARY OF THE INVENTION

The present invention solves these problems by coating the exterior surface of tools used in oil pipes, after suitable preparation of such exterior surface, with a fluoropolymer, which provides a non-stick surface on the tools. The coating on the tool may be a single layer or a multi-layer coating of primer and one or more overcoats.

There is of course an economical advantage to supplying thin coatings in applications which are determined to be less severe. In certain applications, where the tolerance of the pipe in which such tool is used is less than 1.5 mils, and preferably less than 1 ml, a single layer of coating may be used. However, thick coatings are preferred in highly abrasive or in severely corrosive environments. In such environments, the coating may be a multi-layer coating of primer and one or more overcoats.

According to the present invention, coating a tool for use in an oil pipe with a coating comprising a fluoropolymer, can minimize or eliminate the deposition of asphaltene, paraffin wax, and inorganic scale, so as to minimize or eliminate deposition on the tool and therefore, pluggage in the oil pipe and either reduce or minimize corrosion of the exterior surface of the tool. The reduction in deposition can be characterized by being at least 40%, preferably at least 50% of at least one of asphaltene, paraffin wax, and inorganic scale. Reductions of at least 60%, 70%, 80% and even at least 90% can be realized. Preferably these reductions apply to at least two of the deposition materials, and more preferably, to all three of them.

Therefore, according to the present invention, there is provided a A tool for use in an oil pipe comprising a multi-layer coating including a primer layer adhered to its exterior surface and a overcoat adhered to said primer layer.

DETAILED DESCRIPTION OF THE INVENTION

Tools used in the present invention will depend on the environment in which the tools are used. Such tools may be packers, sucker rods, and the like. Exemplary tools used with the present invention are commercially available in the industry and are sold by Halliburton under the trademark Hydrostatic-Set Versa-Trieve® Packers and Hydraulic Set Perma-Series® Packers.

The present invention is particularly applicable to tools, especially those used oil pipes, where both deposition and corrosion are concerns. By oil pipes is meant down-hole, i.e., oil well pipes, or above-ground pipeline systems, i.e., oil-conveying pipes.

The oil pipes in which such tools are used are large. Inner diameters of 2 in (5.08 cm), 2⅜ in (6.03 cm) and 3 in (7.6 cm) and larger and lengths of at least 20 ft (6.1 m) are quite common. While the relative dimensions of the oil pipe are large, the thickness of the coating on the exterior surface of the tool is quite small. Where the coating comprises a primer layer and an overcoat, the primer layer needs only to be thin enough to adhere the overcoat layer to itself and thereby to the exterior surface of the tool. Typically, the thickness of the primer layer is about 0.5 mils, and the thickness of the topcoat is about 1.0 mils. If the tolerance of the pipe in which the tool is used is less than 1.5 mils, then just a primer layer may be used. The primer layer needs only to be thin enough to adhere the overcoat layer to itself and thereby to the exterior surface of the tool.

In another embodiment, the overcoat includes a multiple coating of a first-applied coating on the primer layer to form a lower layer of the overcoat of a perfluoropolymer composition containing a small amount of mica dispersed therein, followed by a subsequent applied coating on the fluoropolymer/mica lower layer of fluoropolymer to form a fluoropolymer upper layer that is free of mica. Each of these layers can be applied by powder coating. Further details on the perfluoropolymer/mica composition is disclosed in U.S. Pat. No. 5,972,494, wherein it is disclosed that the mica constitutes 2 to 15 wt % of the composition and 0.5 to 1.5 wt % of talc may also be present. For purposes of the present invention, these percents refer to the combined weight of the perfluoropolymer and the mica and the talc, if present. The presence of this lower layer further improves the impermeability performance of the coating when the corrosive conditions in particular oil wells require enhanced protection of the tool and the oil pipe.

The coating of the present invention comprises a fluoropolymer. In one embodiment the coating of the present invention consists essentially of a perfluoropolymer. In a perfluoropolymer, the carbon atoms making up the polymer chain, if not substituted by oxygen, are substituted with fluorine atoms. The end groups of the perfluoropolymer may also be entirely fluorine substituted, but other relatively stable end groups, such as —$CF_2H$ and —$CONH_2$, may be present, especially in the fluoropolymer present in the primer layer. The perfluoropolymer used in the present invention is melt flowable at the baking temperature, which will generally be in the range of 300° C. to 400° C. Polytetrafluoroethylene, which has a melt viscosity of at least $10^8$ Pa·s at 372° C., would not be melt flowable.

The perfluoropolymers used in the primer layer and the overcoat are melt flowable fluoropolymers. Examples of such melt-flowable fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-8 carbon atoms, especially 1-3 carbon atoms. Especially preferred comonomers include hexafluoropropylene (HFP), perfluoro (ethyl vinyl ether) (PEVE), perfluoro(propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Typically these copolymers will have a melt flow rate of 1 to 100 g/10 min as determined by ASTM D-1238 and ASTM tests applicable to specific copolymers (ASTM D 2116-91a and ASTM D 3307).

Melt flowable polytetrafluoroethylene (PTFE), commonly referred to as PTFE micropowder, can also be present in the primer layer or the overcoat along with the melt-fabricable copolymers mentioned above, such micropowder having similar melt flow rate. Similarly, minor proportions of non-melt-fabricable PTFE can be present either in the primer layer or the overcoat, or both. In the primer layer the PTFE aids in stratification towards providing a pure perfluoropolymer in the primer at the primer/overcoat interface. PTFE in the overcoat aids in coating toughness, but should not be used in proportions that detract from the impermeability of the overall coating to corrosive fluids and the protection of the tool exterior surface provided by the coating. In either case, the primer layer and the overcoat, while being polymer blends with either PTFE or multiple melt-flowable perfluoropolymers, are still perfluoropolymers.

In the primer/overcoat embodiment, the overcoat comprises a fluoropolymer. The fluoropolymer could be, but need not be a perfluoropolymer. In this embodiment, the primer layer may also, but not necessarily, be comprise a perfluoropolymer. In this case, other materials may be used for the primer layer as long as they promote adhesion of the overcoat to the tool.

The coating may be formed by a number of coating methods, such as application of liquid-based coating composition, and/or the application of powder coating. In the primer layer/overcoat embodiment, different coating methods may be used for the primer layer and the overcoat. Preferred coating methods include liquid-based coatings for the primer layer and the overcoat, or liquid-based coating for the primer layer and powder coating for the overcoat. The coating is heated to form the coating on the surface of the tool. The heating is optionally sufficient to bake the coating. This baking consolidates the coating from the dried liquid state or powder state to a solid film state. In the primer layer/overcoat embodiment, the primer layer is baked, and the thickness of the primer layer after baking is no greater than about 25 micrometers (1 mil). In this regard, the term "baking" is used in its broadest sense of achieving the aforesaid consolidation. Sometimes, the term "curing" is used to describe the film-forming effect; "curing" is included within the meaning of the term "baking". Typically, the baking is carried out by simply heating the coating sufficiently above the melting temperature of the material of the coating to cause the respective material to flow and fuse to become a film-like layer. This allows the overcoat to adhere to the primer layer. In the primer layer/overcoat embodiment, this consolidation will generally involve baking of both of the primer layer and the overcoat, either sequentially or simultaneously. Exemplary of the effect of the consolidation, in this embodiment, after the primer layer is baked and consolidated, the thickness of the primer layer after baking is no greater than about 25 micrometers (1 mil).

The overcoat is impermeable to salt water, as well as to the corrosive materials present in the oil and presents a non-stick surface to the oil, whereby the insoluble organic materials present in the oil do not stick to the overcoat, and restriction of oil flow and pluggage is minimized or avoided. Because of its non-stick property, however, the overcoat does not adhere to the exterior surface of the tool after contaminants are removed from the exterior surface of the pipe. The intervening primer layer provides adhesion both to the overcoat layer and to the exterior surface of the pipe. The primer layer by itself does not provide sufficient non-stick character and impermeability to the corrosive materials present in the oil to protect the exterior surface of the tool from corrosion.

In one preferred embodiment where the total coating thickness is relatively small, the overall coating thickness (primer layer thickness plus overcoat thickness) of the coating being no greater than 8 mils (203 micrometers), the exterior surface of the tool is provided with an adherent coating that presents a non-stick surface to the oil and provides a high degree of corrosion protection to the exterior surface. In another preferred embodiment, the total coating thickness is relatively thick, the overall coating thickness (primer layer thickness plus overcoat thickness in the primer layer/overcoat embodiment) of the coating is at least 26 mils (660 micrometers).

To insure that a thin overcoat does not have pinholes through which corrosive material may pass to ultimately reach the exterior surface of the tool, the step of forming a coating is preferably carried out by applying multiple coats or layers, one top of one another, where, in the embodiment where the coating comprises a primer layer and an overcoat, the overall thickness of the overcoat is still no greater than 7 mils (175 micrometers), preferably no greater than 6 mils (150 micrometers) in the case of using either liquid-based or powder coating overcoat. The succeeding coating application of the liquid or powder overcoat composition will fill in any pinholes present in the preceding overcoat.

In the primer layer/overcoat embodiment, the liquid basis of the coating composition is preferably organic solvent, which avoids the creation of rust on the cleaned and roughened exterior surface of the tool. Rust would interfere with adhesion of the primer layer to the tool exterior surface The heating of the primer layer composition is sufficient to dry the composition to form the primer layer and may even be sufficient to bake the primer layer, prior to the formation of the overcoat. The liquid basis of the overcoat composition is preferably water, to minimize the need for solvent recovery. In the case of the liquid-based overcoat, following its application to the dried or baked primer layer, the overcoat is dried and then baked at a sufficiently high temperature, depending on the particular composition used, to melt the overcoat composition to be film forming and the composition of the primer layer as well if not already baked, bonding the primer layer to the overcoat. By "liquid-based" is meant that that the coating composition is in the liquid form, typically including a dispersion of perfluoropolymer particles in the liquid, wherein the liquid is the continuous phase. The liquid basis, i.e., the liquid medium can be water or organic solvent. In the case of forming the primer layer, the liquid basis is preferably organic solvent and in the case of the overcoat, the liquid basis is preferably water. Organic solvent may, for example, be present in the overcoat liquid composition in a much smaller amount, e.g., no more than 25% of the total weight of liquid, to improve wetting of the overcoat layer and thereby improve application properties.

When the primer composition is applied as a liquid medium, the adhesion properties described above will manifest themselves upon drying and baking of the primer layer together with baking of the next-applied layer to form the non-stick coating on the tool. When the primer layer composition is applied as a dry powder, the adhesion property becomes manifest when the primer layer is baked.

In the primer layer/overcoat embodiment, the composition of the primer layer and the overcoat can be the same or different, provided that when baked together, they adhere to one another, and the primer layer adheres to the tool. When the composition is the same, adequate intercoat adhesion is obtained. In a preferred embodiment, the primer layer and the overcoat both comprise perfluoropolymers. The perfluoropolymers in the primer layer and the overcoat are preferably independently selected from the group consisting of (i) copolymer of tetrafluoroethylene with perfluoroolefin copolymer, the perfluoroolefin containing at least 3 carbon atoms, and (ii) copolymer of tetrafluoroethylene with at least one perfluoro(alkyl vinyl ether), the alkyl containing from 1 to 8 carbon atoms. Additional comonomers can be present in the copolymers to modify properties. Adequate intercoat adhesion is also obtained when one of the perfluoropolymers is copolymer (i) and the other is copolymer (ii). The melting temperature of the coating will vary according to its composition. By melting temperature is meant the peak absorbance obtained in DSC analysis of the coating. By way of example, tetrafluoroethylene/perfluoro(propyl vinyl ether) copolymer (TFE/PPVE copolymer) melts at 305° C., while tetrafluoroethylene/hexafluoropropylene melts at 260° C. (TFE/HFP copolymer). Tetrafluoroethylene/perfluoro-(methyl vinyl ether)/perfluoro(propyl vinyl ether) copolymer (TFE/PMVE/PPVE copolymer) has a melting temperature in between these melting temperature. Thus, in one embodiment of the present invention, when the primer layer comprises TFE/PMVE/PPVE copolymer and the perfluoropolymer in the overcoat is TFE/HFP copolymer, the baking of the overcoat may not be at a high enough temperature to bake the primer layer, in which case the primer layer would be heated to the baked condition prior to applying the overcoat to the primer layer. Alternatively, the primer layer can contain the lower melting perfluoropolymer, in which case the baking of the overcoat would also bake the primer layer.

A preferred ingredient in the primer layer, whether the primer is liquid-based or a dry powder, is a heat resistant polymer binder, the presence of which enables the primer layer to adhere to the tool exterior surface. The binder component is composed of polymer which is film-forming upon heating to fusion and is also thermally stable. This component is well known in primer applications for non-stick finishes, for adhering the fluoropolymer-containing primer layer to substrates and for film-forming within and as part of a primer layer. The fluoropolymer by itself has little to no adhesion to a smooth substrate. The binder is generally non-fluorine containing and yet adheres to the fluoropolymer.

Examples of the non-fluorinated thermally stable polymers include polyamideimide (PAI), polyimide (PI), polyphenylene sulfide (PPS), polyether sulfone (PES), polyarylene-etherketone, and poly(1,4(2,6-dimethylephenyl) oxide) commonly known as polyphenylene oxide (PPO). These polymers are also fluorine-free and are thermoplastic. All of these resins are thermally stable at a temperature of at least 140° C. Polyethersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Polyaryleneetherketones are thermally stable at least 250° C. and melt at temperatures of at least 300° C.

Examples of suitable powder coating compositions comprising perfluoropolymer and polymer binder, wherein these components are associated with one another in multicomponent particles are disclosed in U.S. Pat. Nos. 6,232,372 and 6,518,349.

The polymer binder can be applied as an undercoat to the tool exterior surface after treatment to remove contaminants and an organic solvent solution thereof, prior to application of the primer. The resultant dried thin film of polymer binder can further enhance the adhesion of the primer layer to the tool exterior surface.

For simplicity, only one binder may be used to form the binder component of the composition of the present invention. However, multiple binders are also contemplated for use in this invention, especially when certain end-use properties are desired, such as flexibility, hardness, or corrosion protection. Common combinations include PAI/PES, PAI/PPS and PES/PPS. Typically, the polymer binder content on the primer layer will be from 10-60 wt % based on the combined weight of the perfluoropolymer and polymer binder.

Other ingredients can be present in the primer, such as pigments, fillers, high boiling liquids, dispersing aids, and surface tension modifiers.

The coating composition can be applied to the exterior surface of the tool after removal of contaminants by spraying of the liquid-based composition or dry powder from a nozzle. The dry powder primer can be sprayed using an electrostatic sprayer; electrostatic spraying is conventional in the dry powder coating art.

The preferred liquid which enables the coating composition to be a liquid is one or more organic solvents, within which the perfluoropolymer, present as particles in the preferred embodiment, is dispersed and the polymer binder present either as dispersed particles or in solution in the solvent. The characteristics of the organic liquid will depend upon the identity of the polymer binder and whether a solution or dispersion thereof is desired. Examples of such liquids include N-methylpyrrolidone, butyrolactone, methyl isobutyl ketone, high boiling aromatic solvents, alcohols, mixtures thereof, among others. The amount of the organic liquid will depend on the flow characteristics desired for the particular coating operation.

The solvent should have a boiling point of 50 to 200° C., so as not to be too volatile at room temperature, but to be vaporized at reasonable elevated temperatures, less than the baking temperature of the perfluoropolymer. In the primer layer/overcoat embodiment, the thickness of the primer layer is established by experience with the particular primer composition selected and polymer binder concentrations and the relative amount of solvent that is present. Preferably the primer contains 40 to 75 wt % solvent based on the combined weight of solvent, polymer and polymer binder.

In another embodiment, the coating comprises a barrier layer which includes a plurality of particles which form a mechanical barrier against permeation of water, solvents and/or gases to the tool. The barrier layer has a typical thickness of about 1 to about 10 mils (25-254 micrometers). The barrier layer system may be used on tools which can tolerate a clearance of 5 mils (which would reduce the total clearance of the diameter of the pipe by 10 mils). If the tools can tolerate no more than 1 or 1.5 mils in clearance, then the single component layer should be used. With clearances in between, the primer layer/overcoat system may be used.

Preferably the barrier layer comprises a fluoropolymer and a platelet shaped filler particle that are relatively inert to chemical attack. The particles form a mechanical barrier against permeation of water, solvent and oxygen to the substrate and are present in the amount of about 2 to about 10% by weight based on the total dry weight of the barrier layer. In spray application, the particles tend to align parallel to the exterior surface of the tool. Since oxygen, solvent and water cannot pass through the particles themselves, the presence of aligned particle particles further reduces the rate permeation through the coating which is formed. In the primer layer/overcoat embodiment, the barrier layer is formed between the primer layer and the overcoat. It is also within the scope of this invention that the coating may contain platelet shaped filler particles with or without the presence of an intermediate barrier layer.

Examples of typical platelet shaped filler particles include mica, glass flake and stainless steel flake. The platelet shaped particles of filler component of the barrier layer are preferably mica particles, including mica particles coated with an oxide layer like iron or titanium oxide. These particles have an average particle size of about 10 to 200 microns, preferably 20-100 microns, with no more than 50% of the particles of flake having average particle size of more than about 300 microns. The mica particles coated with oxide layer are those described in U.S. Pat. No. 3,087,827 (Klenke and Stratton); U.S. Pat. No. 3,087,828 (Linton); and U.S. Pat. No. 3,087,829 (Linton).

The micas described in these patents are coated with oxides or hydrous oxides of titanium, zirconium, aluminum, zinc, antimony, tin, iron, copper, nickel, cobalt, chromium, or vanadium. Mixtures of coated micas can also be used.

In the primer layer/overcoat embodiment, when a barrier layer is used, the barrier layer of the coating may include a multiple coating of a first-applied coating on the primer layer to form a lower layer of the overcoat of a fluoropolymer, preferably perfluoropolymer, composition containing a small amount of mica dispersed therein, followed by a subsequent applied coating on the fluoropolymer/mica lower layer of fluoropolymer, and again preferably perfluoropolymer, to form a fluoropolymer upper layer that is free of mica. Each of these layers can be applied by powder coating or by liquid coating. Further details on the perfluoropolymer/mica composition is disclosed in U.S. Pat. No. 5,972,494, wherein it is disclosed that the mica constitutes 2 to 15 wt % of the composition and 0.5 to 1.5 wt % of talc may also be present. For purposes of the present invention, these percents refer to the combined weight of the perfluoropolymer and the mica and the talc, if present. The presence of this lower layer further improves the impermeability performance of the coating when the corrosive conditions in particular oil wells require enhanced protection of the tool.

A tool is lined according to the present invention as follows. Preferably the exterior surface of the tool is subjected to cleaning and/or grit-blasting to improve adhesion of the fluoropolymer coating to the exterior surface. The exterior surface of the tool, as manufactured is generally smooth but with peaks and valleys and is generally coated with preservative to minimize any rusting. Before applying the fluoropolymer coating on the tool exterior surface, such surface is typically cleaned to remove the preservative. Conventional soaps and cleansers can be used. The tool can be further cleaned by baking at high temperatures in air, temperatures of 800° F. (427° C.) or greater. The cleaned interior surface is then preferably grit blasted, with abrasive particles, such as sand or aluminum oxide, to form a roughened surface to improve the adhesion of the primer layer. The grit blasting is sufficient to remove any rust that may be present. The roughening that is desired for primer layer adhesion can be characterized as a roughness average of 70-250 microinches (1.8-6.4 micrometers).

In a preferred embodiment, where a primer layer and overcoat is used, the primer is applied to the cleaned, grit-blasted interior surface of the pipe by spraying a liquid-based composition from a nozzle. The primer is preferably applied to a heated tool in order to prevent running, dripping and sagging. Typically the tool is preheated to 110-125° F. (43-52° C.) but higher temperatures may be used providing that they are about 20° F. below the boiling point of the solvent of the composition.

The coating is applied to the exterior surface of a tool according to a preferred embodiment of the present invention, where a primer layer and overcoat are applied, as follows. The primer can be applied to the exterior surface of the tool after removal of contaminants by spraying of the liquid-based composition or dry powder from a nozzle. The dry powder primer can be sprayed using an electrostatic sprayer; electrostatic spraying is conventional in the dry powder coating art.

After the heating step, the overcoat is spray-applied as a liquid-based composition or as a dry powder onto the primer layer, using a tube supported by sled elements and nozzle similar to that used to apply the primer. It has been found that mere drying of the liquid-based primer to form the primer layer may give the layer adequate integrity. To accomplish multiple applications of the overcoat to the primer layer, the overcoat applied in one spray application is baked so that the subsequent spay application can be carried out without the sled elements scaring or otherwise removing overcoat from the preceding application. In the case of the overcoat being a dry powder, the resultant powder coating should be baked before the next spray application of dry powder if greater coating thickness is desired.

When the primer composition is applied as a liquid medium, the adhesion properties described above will manifest themselves upon drying and baking of the primer layer together with baking of the next-applied layer to form the non-stick coating of the substrate. When the primer is applied as a dry powder, the adhesion property becomes manifest when the primer layer is baked.

The pipe is then baked to melt the overcoat, again by placing the pipe in an oven heated to the desired temperature. Typically, the baking temperature applied to the overcoat through the thickness of the wall of the pipe and the primer layer, will be at least 20° C. above the melting point of the overcoat, with the temperature and time of exposure being sufficient to bake the overcoat. The same is true with respect to the baking of the primer layer.

The heating of the primer coating is sufficient to dry the coating to form the primer layer and may even be sufficient to bake the primer layer, prior to application of the preformed film. By "baking" is meant that the fluoropolymer layer is heated sufficiently at a temperature above its melting temperature to cause the fluoropolymer to flow and form a continuous film-like layer. By melting temperature is meant the peak absorbance obtained in DSC analysis of the fluoropolymer. The barrier layer if used is applied in the same way as the primer layer and may be heated with the primer layer or applied to a dry primer layer and then heated to drying or baking prior to application of the coating.

By "fusion bonding" is meant that the tool is heated sufficiently to melt bond the overcoat or preformed film to the primer layer or intervening barrier layer. That is to say, that the primer/overcoat or film interface, or the interfaces of the primer layer/barrier layer/overcoat or preformed film as the case may be, are melted together sufficiently to adhere the overcoat firmly to the layer(s). Fusion bonding temperatures are dependent on the particular fluoropolymer present in the or overcoat or preformed film. For PFA or FEP, the tool is heat (baked) by conventional means to a temperature between 600 to 700° F. (315 to 371° C.). For ETFE, the tool is heated by conventional means to a temperature between 550° to 630° F. (228 to 332° C.). Time for fusion bonding will be dependent on the baking temperature used but is typically from 5 minutes to 60 minutes. Baking time and temperature must be sufficient to achieve a firm melt bond between the overcoat or preformed film and the primer or barrier layer. As the tool cools, there is a tendency for the preformed film to shrink. Unexpectedly, the intercoat bonding between the primer layer (and barrier layer, if present) and the overcoat or preformed film is sufficient to prevent the film from pulling away from the primer layer or barrier layer.

The melting temperature of the coating will vary according to its composition. By melting temperature is meant the peak absorbance obtained in DSC analysis of the coating. By way of example, tetrafluoroethylene/perfluoro(propyl vinyl ether) copolymer (TFE/PPVE copolymer) melts at 305° C., while tetrafluoroethylene/hexafluoropropylene melts at 260° C. (TFE/HFP copolymer). Tetrafluoroethylene/perfluoro-(methyl vinyl ether)/perfluoro(propyl vinyl ether) copolymer (TFE/PMVE/PPVE copolymer) has a melting temperature in between these melting temperature. Thus, in one embodiment of the present invention, when the primer layer comprises a perfluoropolymer which is TFE/PMVE/PPVE copolymer and the overcoat comprises a perfluoropolymer which is TFE/HFP copolymer, the baking of the overcoat may not be at a high enough temperature to bake the primer layer, in which case the primer layer would be heated to the baked condition prior to applying the overcoat to the primer layer. Alternatively, the primer can contain the lower melting perfluoropolymer, in which case the baking of the overcoat would also bake the primer layer.

The tools of the present invention are able to withstand conditions as high as 350° F. (177° C.) and 20,000 psi (138 MPa) present in some high temperature/high pressure reserves. The invention is also applicable to tools used in the Chemical Processing Industry (CPI), especially in those applications where temperatures such as those described above are encountered. In the CPI temperatures of at least about 350° F. (177° C.) and even as high as 400° F. (204° C.) are used. The tools show superior permeation resistance to corrosive chemicals due to both to their construction, i.e., especially when a primer layer and overcoat or primer layer and preformed film liner are used, and especially with an optional intervening barrier layer, and their strong adherence to the interior surface of the tool with the aid of a primer. The coated tools of the present invention are able to withstand the above described conditions for continuous service, e.g., for at least 30 days, preferably at least 60 days, and more preferably at least 12 months.

Because of all the above-noted advantages, the present invention is capable of reducing the deposition of at least one of asphaltenes, paraffin wax and inorganic scale by at least 40%, preferably at least 50%, as compared to the interior surface of said tool without said coating being present. These reductions are also made in comparison to tool lined with only an epoxy resin on the interior surface of the tool.

In fact, reductions of at least 60%, 70%, 80% and even at least 90% have been realized. Preferably these reductions apply to at least two of the deposition materials, and more preferably, to all three of them. Thus, in accordance with the present invention, there is also provided a method for reducing the deposition in a tool of at least one of asphaltenes, paraffin wax, and inorganic scale by at least 40% as compared to the exterior surface of the tool without the coating being present.

The resultant tool then has a continuous adherent fluoropolymer coating on its exterior surface, with the exposed surface of the fluoropolymer providing a non-stick surface for oil to eventually flow through the pipe and for its constituents. The coating follows the peaks and valleys of the exterior surface of the tool and to some extent fills them in with the primer and overcoat layers.

The fluoropolymer coating on the tool of the present invention both acts as a non-stick surface for the oil and its constituents, but also to isolate the steel structure of the tool, as well as the pipe from corrosion. In oil wells, temperatures at the bottom of the well can reach 500° F. (260° C.), but will more typically be in the range of 350-450° F. (177-232° C.). The fluoropolymers present in the coating are selected to have a melting temperature greater than the temperature present at the bottom of the well. The fluoropolymer forms a physical barrier to the corrosive environment of the hot oil. The fluoropolymer is also resistant to permeation of this corrosive environment through the thickness of the coating. The overcoat provides the effective permeation resistance. This same corrosion protection is provided to pipe used in a surface pipeline, where temperatures will be lower, but contact with the oil occurs for a long period of time.

The coating on the tool of the present invention can minimize or eliminate the deposition of asphaltene, paraffin wax, and inorganic scale, so as to minimize of eliminate deposition on the tool and therefore, pluggage in the oil pipe and either reduce or minimize corrosion of the exterior surface of the tool. The reduction in deposition can be characterized by being at least 40%, preferably at least 50% of at least one of asphaltene, paraffin wax, and inorganic scale. Reductions of at least 60%, 70%, 80% and even at least 90% can be realized. Preferably these reductions apply to at least two of the deposition materials, and more preferably, to all three of them.

These reductions are determined by the Asphaltene Deposition Test, the Paraffin Deposition Test, and the Inorganic Scale Deposition Test, respectively, disclosed in the Examples. Even better results than shown by these model Tests are expected because of the rapid flow of oil through the oil pipe in field use of the tool. The corrosion protection imparted by the coating to the exterior surface of the tool can be characterized by substantial impermeability to a strong salt solution at a high temperature for a long period of time in accordance with the Salt Water Permeation Test described in the Examples.

It is within the scope of the invention that an oil pipe in which the tool is used may be lined with coatings as described above with respect to the tool. The combination of such coatings on both pipes and tools can further enhance the benefits of deposition reduction and corrosion resistance exhibited by the coated tool as described above.

Test Methods

Paraffin Deposition Test

A cold finger apparatus, available at Westport Technology Center International (Houston, Tex.) is used to test the baked coatings as prepared in the Examples for the degree of release (non-stick) they exhibit. The apparatus includes a circulating beaker (double-walled) filled with mineral oil and connected to a first temperature bath which is placed on a magnetic mixing plate. A stainless steel cup with a magnetic stirring bar is submerged in the mineral oil and the temperature set to 140° F. (60° C.). A cold finger (tubular projection) is connected to a second water circulating temperature bath, and the temperature set to 60° F.

Stainless steel sleeves (6" long, 0.5" inside ID, 0.625" OD) closed flat at the bottom which are coated as described in the Examples are washed with solvent (toluene, then methanol) and placed in a hot oven to ensure a clean surface for wax to deposit on. The sleeve is then weighed, secured over the finger with a set screw at the top to create a tight fit, and allowed to cool for thirty minutes. After thirty minutes, the sleeve is attached over the cold finger in a tight fit and submerged in the crude oil for twenty-four hours.

Crude oil known to have a large wax content with a wax appearance temperature of approximately 105° F. is used for this test. The crude is initially heated to 150° F. (66° C.) and centrifuged twice to remove any water and sediments. The source sample of crude was maintained at 150° F. (66° C.) during the duration of the testing to ensure the wax remained in solution.

At the completion of the twenty-four hour test time, the sleeve is removed from the crude and allowed to sit for one hour at 60° F. (16° C.) in a nitrogen environment. A final weight is measured. Weight data collected before and after submersion are used to calculate the wax deposition on the sleeve. From the material balance a mass per unit area was calculated for comparison purposes. The baseline for comparison is the paraffin adhesion test performed on commercially available epoxy-resin coated oil pipe, wherein the deposition of paraffin on the epoxy resin coating amounted to 0.0652 g/cm$^2$.

Adhesion Tests

Test panels of cold rolled steel 4.0"×12.0" (10.1 cm×30.5 cm) panels are cleaned with an acetone rinse. The panel has a grit blast surface. The panels are coated according to the description in each of the examples. The panels are subjected to the following two adhesion tests.

(1) Post Boiling Water Fingernail Adhesion (PWA)

Coated test panels are submerged in boiling water for 20 minutes. The water is allowed to come to a full boil after inserting the coated panel, before timing is begun. After the boiling water treatment, the panel is cooled to room temperature and dried thoroughly. The fingernail scratch test involves the use of the fingernail, to chip or peel away the coating from the edge of a deliberate knife scratch in the film, to test the degree of adhesion of the film. If the coating can be pulled away from the substrate for 1 cm or more, the coating is considered to fail the PWA test. If the coating cannot be pulled loose for a distance of 1 cm, the coating is considered to pass the PWA test.

(2) Cross-Hatch Adhesion

Coated substrates are subjected to a cross-hatch (x-hatch) test for adhesion. The coated sample is scribed with a razor blade, aided by a stainless steel template, to make 11 parallel cuts about 3/32 inch (2.4 mm) apart through the film to the metal surface. This procedure is repeated at right angles to the first cuts to produce a grid of 100 squares. The coated and scribed sample is immersed in boiling water for 20 minutes, and then is removed from the water and cooled to room temperature without quenching the sample. Then a strip of transparent tape (3M Brand No. 898), 0.75 by 2.16 inch (1.9 by 5.5 cm), is pressed firmly over the scribed area with the tape oriented in a parallel direction to the scribed lines. The tape is then pulled off at a 90° angle rapidly but without jerking. This step is repeated at a 90° angle to the first step with a fresh piece of tape, and then repeated two times more again at 90° angles to the previous step, each time with a fresh piece of tape. Passing the test requires that no squares be removed from the 100-square grid.

EXAMPLES

The following Examples illustrate the effects of the present invention on coupons which are coated with coatings according to the present invention.

In the following Examples, substrates for coating are cleaned by baking 30 min @ 800° F. (427° C.) and grit blasted with 40 grit aluminum oxide) to a roughness of approximately 70-125 microinches Ra. Liquid coatings are applied by using a spray gun, Model Number MSA-510 available from DeVilbiss located in Glendale Heights, Ill. Powder coatings are applied by using Nordson manual electrostatic powder spray guns, Model Versa-Spray I located in Amhearst, Ohio.

For determining the degree of release of the coatings, the substrate being coated is a stainless steel sleeve suitable for use in the apparatus described above in the Paraffin Deposition Test. For determining the adhesion quality, the substrate being coated is a carbon steel panel suitable for use in the PWA Test and the Cross-Hatch Adhesion Test described above.

The primer layers formed in the Examples have the following pre-bake compositions:

TABLE 1

| | Liquid Primers | | |
|---|---|---|---|
| | Primer | | |
| Ingredient | 1 Wt % | 2 wt % | 3 wt % |
| Fluoropolymer | | | |
| FEP | 12.5 | | 10.9 |
| ETFE | | 20.7 | |
| Polymer binder | | | |
| Polyamideimide | 1.1 | 3.7 | 11.9 |
| Polyethersulfone | 7.6 | | |
| Polyphenylene Sulfide | | 3.4 | |
| Solvents | | | |
| NMP* | 47.8 | 1.9 | 40.7 |
| Other Organics** | 20.1 | 4.7 | 32.0 |
| Water | | 60.2 | |
| Pigments | 9.9 | 4.2 | 1.7 |
| Dispersing Agent | 1.0 | 1.2 | 2.8 |
| Total | 100 | 100 | 100 |

*NMP is N-methyl-2-pyrrolidone
**Other organics may include solvents such as MIBK (methyl isobutyl ketone), hydrocarbons such as heavy naphtha, xylene etc., furfuryl alcohol, triethanol amine or mixtures thereof.
FEP: TFE/HFP fluoropolymer containing 11-12.5 wt % HFP, an average particle size of 8 micrometers and a melt flow rate of 6.8-7.8 g/10 min measured at 372° C. by the method of ASTM D-1238.
ETFE: E/TFE/PFBE fluoropolymer containing 19-21 wt % ethylene and 3-4.5 wt % PFBE having average particle size of 8 micrometers and a melt flow rate of 6-8 g/10 min measured at 298° C. by the method of ASTM D-1238.

The overcoat layers formed in the Examples have the following pre-bake compositions:

TABLE 2

| | Powder Overcoats | | | | | | |
|---|---|---|---|---|---|---|---|
| | Overcoat | | | | | | |
| Ingredient | A wt % | B wt % | 1 wt % | 2 wt % | 4 wt % | 5 wt % | 6 wt % |
| Epoxy | 100 | | | | | | |
| ETFE | | 100 | | | | | |
| Perfluoropolymers | | | | | | | |
| PFA | | | | | 99.2 | 100 | |
| FEP | | | | | | | 100 |
| PFA Fluorinated | | | 100 | | | | |

TABLE 2-continued

| | Powder Overcoats | | | | | | |
|---|---|---|---|---|---|---|---|
| | Overcoat | | | | | | |
| Ingredient | A wt % | B wt % | 1 wt % | 2 wt % | 4 wt % | 5 wt % | 6 wt % |
| PFA Modified PEVE | | | | 100 | | | |
| Stabilizer (Zn) | | | | | 0.8 | | |
| Total | 100 | 100 | 100 | 100 | 100 | 100 | 100 |

FEP: TFE/HFP fluoropolymer resin containing 11-12.5 wt % HFP having a melt flow rate of 6.8-7.8 g/10 min and an average particle size of 35 micrometers.
PFA: TFE/PPVE fluoropolymer resin containing 3.8-4.8 wt % PPVE having a melt flow rate of 10-17 g/10 min and an average particle size of 35 micrometers.
PFA modified with PEVE: TFE/PPVE/PEVE fluoropolymer resin containing 6.8-7.8 wt % PEVE prepared according to the teachings of U.S. Pat. No. 5,932,673 (Aten et al./DuPont) having a melt flow rate of 13-18 g/10 min and an average particle size of 8 micrometers.
PFA Fluorinated: TFE/PPVE fluoropolymer resin containing 3.8-4.8 wt % PPVE prepared according to the teachings of U.S. Pat. No. 4,743,658 (Imbalzano et al./Du Pont) having a melt flow rate of 12-20 g/10 min and an average particle size range of 25 micrometers.
PFA: TFE/PPVE fluoropolymer resin containing 3.8-4.8 wt % PPVE having a melt flow rate of 10-17 g/10 min and an average particle size of 35 micrometers.

TABLE 3

| | Liquid Overcoat |
|---|---|
| Ingredient | Overcoat 3 wt % |
| Perfluoropolymer PFA | 45.0 |
| Other Organics | 0.6 |
| Water | 43.8 |
| Thickener | 10.1 |
| Dispersing Agents | 0.5 |
| Total | 100 |

TABLE 4

| | Liquid Midcoat |
|---|---|
| Ingredient | Midcoat 1 wt % |
| Perfluoropolymer PFA | 41.2 |
| Glycerine | 8.3 |
| Water | 42.8 |
| Red Mica | 3.9 |
| Thickener | 1.1 |
| Dispersing Agents | 0.4 |
| Other Organics | 1.1 |
| Tin Metal | 1.2 |
| Total | 100.0 |

The baking conditions are set forth in the Examples. Good adhesion of the primer layer to the substrate and of the primer layer to the overcoat layer is indicated by their performance in the PWA Test and the Cross-Hatch Adhesion Test.

The non-stick characteristic of the baked coatings in the Examples are confirmed by subjecting the coatings to the paraffin deposition test as described above. The baseline for comparison is the paraffin deposition test performed on commercially available epoxy-resin coated oil pipe, wherein the deposition of paraffin on the epoxy resin coating amounted to 0.0652 g/cm². The examples of this invention all have coatings with a wax deposition below that of standard epoxy resin coating.

Comparative Example A

Epoxy Standard

A layer of coating A (epoxy powder) is applied to a prepared stainless steel sleeve, followed by baking at 316° C. for 20 minutes. The dry film thickness (DFT) of the paint layer is 100-125 micrometers. When the coated sleeve is subjected to the Paraffin Deposition Test, a deposition of 0.0652 g/cm² is obtained.

Comparative Example B

ETFE Primer/ETFE Overcoat

A layer of primer 2 (aqueous ETFE) is applied to a prepared stainless steel sleeve and a prepared carbon steel panel, followed by baking at 150° C. for 10 minutes. The dry film thickness (DFT) of the primer layer is 12-19 micrometers (p). A layer of overcoat B (powder ETFE) is applied over the dried primer layer. It is baked at 316° C. for 20 minutes. The total DFT is 100-125 micrometers and the total thickness of the overcoat is 81-113 micrometers. When the coated sleeve is subjected to the Paraffin Deposition Test, a deposition of 0.0327 g/cm² is obtained. When the coated carbon steel panel is subjected to the PWA test and Cross-Hatch Adhesion Test, the panel passes both tests.

Aqueous primers are not preferred for use in this invention because of the potential for reduced corrosion resistance over a prolonged period of time. ETFE overcoats are inferior to the perfluoropolymer overcoats of this invention.

Comparative Example C

Uncoated Substrate

An uncoated prepared stainless steel sleeve is subjected to the Paraffin Deposition Test, a deposition of 0.0296 g/cm² is obtained.

Example 1

FEP Primer/Modified PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 1 (PFA modified with PEVE powder) is applied over the dried primer layer. It is baked at 399° C. for 20 minutes. The total DFT is 60-75 micrometers. A second layer of overcoat is applied. It is baked at 371° C. for 20 minutes. The total DFT is 100-125 micrometers and the total thickness of the overcoat is 81-113 micrometers. When the coated sleeve is subjected to the Paraffin Deposition Test, a deposition of only 0.0168 g/cm² is obtained. When the coated carbon steel panel is subjected to the PWA test and Cross-Hatch Adhesion Test, the panel passes both tests.

Example 2

FEP Primer/Fluorinated PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 2 (fluorinated PFA powder) is applied over the dried primer layer. It is baked at 399° C. for 20 minutes. The total DFT is 60-75 micrometers. A second layer of overcoat 2 is applied. It is baked at 371° C. for 20 minutes. The total DFT is 100-125 micrometers and the total thickness of the overcoat is 81-113 micrometers.

When the coated sleeve is subjected to the Paraffin Deposition Test, a deposition of only 0.0145 g/cm² is obtained. When the coated carbon steel panel is subjected to the PWA test and Cross-Hatch Adhesion Test, the panel passes both tests.

Example 3

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 3 (PFA liquid) is applied over the dried primer layer. It is baked at 399° C. for 20 minutes. The total DFT is 60-75 micrometers. A second layer of overcoat 3 is applied. It is baked at 371° C. for 20 minutes. The total DFT is 100-125 micrometers and the total thickness of the overcoat is 81-113 micrometers.

When the coated sleeve is subjected to the Paraffin Deposition Test, a deposition of only 0.0124 g/cm² is obtained. When the coated carbon steel panel is subjected to the PWA test and Cross-Hatch Adhesion Test, the panel passes both tests.

Example 4

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 4 (PFA powder) is applied over the dried primer layer. It is baked at 399° C. for 20 minutes. The total DFT is 60-75 micrometers. A second layer of overcoat 4 is applied. It is baked at 371° C. for 20 minutes. The total DFT is 100-125 micrometers and the total thickness of the overcoat is 81-113 micrometers.

When the coated sleeve is subjected to the Paraffin Deposition Test, a deposition of only 0.0124 g/cm² is obtained. When the coated carbon steel panel is subjected to the PWA test and Cross-Hatch Adhesion Test, the panel passes both tests.

Example 5

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 5 (PFA powder) is applied over the dried primer layer. It is baked at 399° C. for 20 minutes. The total DFT is 60-75 micrometers. A second layer of overcoat 5 is applied. It is baked at 371° C. for 20 minutes. The total DFT is 100-125 micrometers and the total thickness of the overcoat is 81-113 micrometers.

When the coated sleeve is subjected to the Paraffin Deposition Test, a deposition of only 0.0116 g/cm$^2$ is obtained. When the coated carbon steel panel is subjected to the PWA test and Cross-Hatch Adhesion Test, the panel passes both tests.

Example 6

FEP Primer/FEP Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 6 (FEP powder) is applied over the dried primer layer. It is baked at 399° C. for 20 minutes. The total DFT is 60-75 micrometers. A second layer of overcoat 6 is applied. It is baked at 371° C. for 20 minutes. The total DFT is 100-125 micrometers and the total thickness of the overcoat is 81-113 micrometers.

When the coated sleeve is subjected to the Paraffin Deposition Test, a deposition of only 0.0110 g/cm$^2$ is obtained. When the coated carbon steel panel is subjected to the PWA test and Cross-Hatch Adhesion Test, the panel passes both tests.

Example 7

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 5 (PFA powder) is applied over the dried primer layer. It is baked at 399° C. for 20 minutes. The total DFT is 60-75 micrometers. A second layer of overcoat 5 is applied. It is baked at 371° C. for 20 minutes. Additional layers of overcoat 1 are applied and baked at 343° C. for 20 minutes until the total DFT is 950-1050 micrometers and the total thickness of the overcoat is 931-1038 micrometers.

When the coated sleeve is subjected to the Paraffin Deposition Test, a deposition of only 0.0098 g/cm$^2$ is obtained. When the coated carbon steel panel is subjected to the PWA test and Cross-Hatch Adhesion Test, the panel passes both tests.

Example 8

FEP/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 2 is applied over the dried primer layer. It is baked at 399° C. for 20 minutes. The total DFT is 60-75 micrometers. A second layer of overcoat 2 (fluorinated PFA) is applied. It is baked at 371° C. for 20 minutes. Additional layers of overcoat 4 are applied and baked at 343° C. for 20 minutes until the total DFT is 950-1050 micrometers and the total thickness of the overcoat is 931-1038 micrometers.

When the coated sleeve is subjected to the Paraffin Deposition Test, a deposition of only 0.0042 g/cm$^2$ is obtained. When the coated carbon steel panel is subjected to the PWA test and Cross-Hatch Adhesion Test, the panel passes both tests.

Example 9

FEP Primer/PFA Overcoat

A layer of primer 3 (liquid FEP) is applied to a prepared stainless steel sleeve and a prepared carbon steel panel, followed by baking at 150° C. for 10 minutes. The dry film thickness (DFT) of the primer layer is 8-12 micrometers. A layer of overcoat 2 (fluorinated PFA) is applied over the dried primer layer. It is baked at 399° C. for 20 minutes. The total DFT is 60-70 micrometers. A second layer of overcoat 2 (fluorinated PFA) is applied. The total DFT is 80-110 micrometers and the total thickness of the overcoat is 68-102 micrometers. It is baked at 371° C. for 20 minutes.

When the coated sleeve is subjected to the Paraffin Deposition Test, a deposition of only 0.0042 g/cm$^2$ is obtained. When the coated carbon steel panel is subjected to the PWA test and Cross-Hatch Adhesion Test, the panel passes both tests.

Example 11

Inorganic Scale Deposition Test

A number of the overcoats (FEP and PFA) from the foregoing Examples were subjected to coupon immersion testing in brine solutions in order to determine the reduction in inorganic scale deposition of the coated coupon, with the result being that scale deposition was reduced by more than 50 wt % as compared to the uncoated coupons. These tests were done by soaking coated and uncoated steel coupons in calcite and barite brine solutions having the following compositions:

| Brine A | g/kg water | Brine B | g/kg |
|---|---|---|---|
| CaCl$_2$•2H$_2$O | 36.87 | same | 8.6 |
| KCl | 11.43 | same | 4.38 |
| MgCl$_2$•6H$_2$O | 1.8 | same | 0.41 |
| NaCl | 138.9 | same | 89.09 |
| Na$_2$SO$_4$ | 0.32 | — | |
| — | | BaCl$_2$ | 3.08 |

The coupons were suspended for two days under 100 psi (6.9 MPa) pressure in either in Brine A heated at 140 F (60° C.) or in Brine B heated at 90° F. (32° C.) and the weight pickups (scale deposition) for the coated coupons were compared to that for the uncoated steel coupons to reveal the reduction in scale deposition for the coupons coated with coatings of the present invention.

Example 12

Asphaltene Deposition Test

Asphaltene is a mixture of amorphous high molecular weight, polynuclear aromatic compounds, containing C, H, O, N, and S, and often metals such as V or Ni. Asphaltene is soluble in oil, but becomes insoluble with drop in pressure, change in pH, or solvency change such as occurs in oil pipe utility. Asphaltene deposition can be measured by the flow loop method as practiced by the Petroleum Research Center located at the New Mexico Institute of Mining and technology in Socorro, N. Mex. Briefly, the material to be tested is formed into a loop and oil is flowed through the loop under conditions to cause the asphaltene in the oil to become insoluble, so that it has a chance to deposit on the interior surface of the loop. The deposition of asphaltene is determined by weighing the loop after the flow experiment is completed, comparing such weight with the weight of the loop before the flow test. In greater detail, the loop being tested is a tube that 100 ft (30.5 m) long and has an interior diameter of 0.03 in (0.75 mm) and is made of either one of the overcoat perfluoropolymers disclosed in the foregoing Examples or of steel. The tube is formed into a coil (loop), like a spring, so that it will fit into a water bath maintained at 60° C. A 50/50 vol % mixture of asphaltene-containing oil and n-pentadecane solvent is metered through the loop at a rate of 0.24 ml/hr for 24 hrs. The oil tested had the following characteristics: API gravity of 28.80, viscosity of 30 cP at 20°, and was composed of 51.1% saturates, 28.3% aromatics, 14.5% resins, 6.1% asphaltenes and contained 19 ppm Ni and 187 ppm V. For the uncoated steel loop, the weight gain from deposited asphaltene is 0.51 g, while for FEP and the fluorinated PFA of Example 8, there is no weight gain, indicating the effectiveness of the perfluoropolymer to reduce asphaltene deposition.

Example 13

Salt Water Permeation Test

This test is conducted to determine the salt water permeability of perfluoropolymers as compared to epoxy resin by exposing 5 mil (127 micrometers) thick coatings of these materials on steel coupons to salt water under severe conditions and subjecting the so-exposed coupons to the well-known Log Z-Electrical Impedance Spectroscopy. Impedance of the coating before and after the exposure is compared. A reduction in impedance indicates the permeability of the coating. In greater detail, the coated coupons are suspended in an autoclave having: 1) an aqueous phase with a 5 wt % aqueous solution of NaCl, 2) an organic phase with 50 volume % kerosene and 50 volume % toluene, and 3) a gas phase with 5 volume % hydrogen sulfide ($H_2S$), 5 volume % carbon dioxide ($CO_2$) and 90 volume % methane ($CH_4$), which is maintained at approximately 251° F. (122° C.) therein in contact with a portion of the coating. The autoclave is maintained at 251° F. (122° C.) and 1026 psi (70.8 MPa) for 29 days. The impedance of the coating is measured (before and after salt water exposure) using an electrochemical cell consisting of the coated coupon, a reference electrode, and an inert counter electrode. The electronic measuring equipment consists of a potentiostat, a frequency response analyzer and a computer with electrical impedance spectroscopy software. Impedance of the coating is measured as a function of the frequency of the applied AC voltage. The frequency ranges from 0.001 to 100 kHz. The resulting data is presented in the form of a Bode plot, consisting of Log Z plotted versus Log f, where Z is the impedance in ohms cm and f is frequency in Hertz. The comparison in impedance results is taken a 0.1 of the Bode plot, as follows:

| Coating | Log Z impedance | |
|---------|-----------------|----------------|
|         | Before Exposure | After Exposure |
| PFA     | 11.0            | 10.9           |
| FEP     | 11.0            | 11.0           |
| Epoxy   | 10.8            | 7.1            |

Tests of a one-coat system of FEP/PES which could only be applied to a thickness of 2 mils, are subjected to the same Autoclave conditions, and result in a Log Z impedance before exposure of 9.4, and after exposure, of 5.8.

The 34% decrease in impedance for the epoxy resin coating represents a substantial permeability of this coating to the salt water, and indeed the coating had blistered in places from the underlying steel coupon. In contrast, the impedance of perfluoropolymer coatings with no binder is substantially unchanged and there is no separation (no blistering) of the coating from the steel coupon, indicating substantial impermeability of these coatings to the salt water. This substantial impermeability can therefore be characterized by the absence of coating separation of the coating from the steel coupon or quantitatively by the reduction in Log Z impedance of less than 10%, preferably less than 5%. When the coated coupons are subjected to $H_2S$ gas and methane/toluene liquid mixture in the same autoclave under the same conditions as the salt water testing, no change in the coatings is noticed, indicating the greater severity of the salt water exposure.

Example 14

Single Layer Coating

Primer 1 is used a single layer coating on the coupon and tested as set forth in Example 11. Despite the presence of non-fluorine containing polymer binder (polyamideimide and polyether sulfone) in the primer composition, the deposition of inorganic scale on the coating is much less than for the bare steel coupon and about the same as for the FEP overcoat.

What is claimed is:

1. A tool for use in an oil pipe comprising a multi-layer coating including a primer layer adhered to its exterior surface and a overcoat adhered to said primer layer, wherein the coating comprises a barrier layer formed between the primer layer and the overcoat, and the barrier layer includes a plurality of particles which form a mechanical barrier against permeation of water, gas and solvents to the tool.

2. The tool of claim 1, wherein the coating has a corrosion resistance defined by Log Z impedance, where Log Z is greater than 6.

3. The tool or claim 1, wherein the coating reduces the deposition of at least one of asphaltenes, paraffin wax, and inorganic scale as compared to the interior surface of said oil pipe without said coating being present.

4. The tool of claim 3, wherein the deposition is reduced by at least 40%.

5. The tool of claim 1, wherein the primer layer comprises a perfluoropolymer and the overcoat comprises a perfluoropolymer.

6. The tool of claim 5, wherein said perfluoropolymer in said primer layer and said overcoat is independently selected from the group consisting of copolymer of tetrafluoroethylene with perfluoroolefin, said perfluoroolefin containing at least 3 carbon atoms, and copolymer of tetrafluoroethylene with at least one perfluoro(alkyl vinyl ether), said alkyl containing from 1 to 8 carbon atoms.

7. The tool of claim 1, wherein the particles comprise mica.

* * * * *